United States Patent
Kaneko et al.

(10) Patent No.: US 12,119,736 B2
(45) Date of Patent: Oct. 15, 2024

(54) POWER SUPPLY UNIT CAPABLE OF REDUCING POSSIBILITY OF OVERCURRENT AND CURRENT SHORTAGE

(71) Applicant: TOYOTA JIDOSHA KABUSHIKI KAISHA, Toyota (JP)

(72) Inventors: Tomohiko Kaneko, Yokohama (JP); Nobuyuki Kitamura, Minamitsuru-gun (JP); Takahiro Umehara, Susono (JP); Masayuki Ito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 17/821,454

(22) Filed: Aug. 22, 2022

(65) Prior Publication Data
US 2023/0070203 A1    Mar. 9, 2023

(30) Foreign Application Priority Data
Sep. 7, 2021   (JP) .................... 2021-145199

(51) Int. Cl.
*H02M 1/00* (2007.01)
*H01M 8/04537* (2016.01)
*H01M 8/04858* (2016.01)

(52) U.S. Cl.
CPC ..... *H02M 1/0009* (2021.05); *H01M 8/04552* (2013.01); *H01M 8/04873* (2013.01); *H02M 1/0043* (2021.05)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 8,610,414 B2 * 12/2013 Fuma ................. H02M 3/1584
                                              323/272
9,350,248 B2 *  5/2016 Kumada ................ H05B 45/38
(Continued)

FOREIGN PATENT DOCUMENTS

EP       2933907 A1    10/2015
JP   2014212587 A    11/2014
(Continued)

OTHER PUBLICATIONS

U.S. Appl. No. 17/654,173, United States Patent and Trademark Office, filed Mar. 9, 2022, 53 pages.

*Primary Examiner* — Jeffrey A Gblende
(74) *Attorney, Agent, or Firm* — Hunton Andrews Kurth LLP

(57) ABSTRACT

A power supply unit includes a power supply and a converter. The converter performs operation selected from the group consisting of boosting and stepping down of an output voltage of the power supply; and includes a reactor in which n-phase coils are magnetically coupled to each other, n-phase switches, and a control unit. The control unit controls duty cycles of the n-phase switches; monitors a current value flowing through the n-phase coils; and performs phase switching control when the control unit determines that an operation condition described below is satisfied, the phase switching control being control in which the control unit performs phase switching from in phase to out of phase in the case where the n-phase switches are being driven in phase and performs phase switching from out of phase to in phase in the case where the n-phase switches are being driven out of phase.

9 Claims, 8 Drawing Sheets

(58) Field of Classification Search
CPC ............... H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38

See application file for complete search history.

(56) References Cited

U.S. PATENT DOCUMENTS

| | | | |
|---|---|---|---|
| 10,749,442 B2 * | 8/2020 | Kitamoto | ............... B60L 58/40 |
| 2017/0236488 A1 | 8/2017 | Suzuki | |
| 2017/0244338 A1 * | 8/2017 | Kitamoto | ............. H02M 7/539 |
| 2019/0052171 A1 | 2/2019 | Kitamoto | |
| 2020/0161974 A1 | 5/2020 | Tano | |

FOREIGN PATENT DOCUMENTS

| | | |
|---|---|---|
| JP | 2015019448 A | 1/2015 |
| JP | 2017143708 A | 8/2017 |
| JP | 2020088971 A | 6/2020 |

* cited by examiner

POWER SUPPLY UNIT CAPABLE OF REDUCING POSSIBILITY OF OVERCURRENT AND CURRENT SHORTAGE

CROSS-REFERENCE TO RELATED APPLICATION

This application claims priority to Japanese Patent Application No. 2021-145199 filed on Sep. 7, 2021, incorporated herein by reference in its entirety.

BACKGROUND

1. Technical Field

The present disclosure relates to power supply units.

2. Description of Related Art

Various studies have been conducted on converters included in power supply units provided in systems that are mounted on vehicles such as fuel cell electric vehicles (FCEVs). A circuit composed of a reactor, a switch, a diode, a capacitor, etc. is often used in direct current-to-direct current (DC-to-DC) converters that are used in various electronic devices etc. Such a DC-to-DC converter controls an increase and decrease in current flowing through the reactor by using an ON/OFF signal for the switch.

For example, Japanese Unexamined Patent Application Publication No. 2020-088971 (JP 2020-088971 A) discloses a technique capable of reducing the possibility that a boost converter may output an unexpectedly large current.

Japanese Unexamined Patent Application Publication No. 2017-143708 (JP 2017-143708 A) discloses a semiconductor device capable of detecting an abnormality due to an abnormality in a load when a power supply circuit supplies power to the load.

Japanese Unexamined Patent Application Publication No. 2014-212587 (JP 2014-212587 A) discloses a converter device that separately controls a continuous mode in which a current continues to flow through a reactor and a discontinuous mode in which a current flows intermittently through the reactor by using duty cycles.

Japanese Unexamined Patent Application Publication No. 2015-019448 (JP 2015-019448 A) discloses a converter device that sets a duty cycle using a correction value that reflects the history of the difference between the target output of a reactor and the actual output of the reactor and the inductance of the reactor.

SUMMARY

Converters have a discontinuous mode in which an increase in reactor current is insensitive to the duty and a continuous mode in which an increase in reactor current is sensitive to the duty. Converters will cause power error unless controlled at an appropriate duty cycle in each mode.

In the related art, an overcurrent or current shortage occurs in the boundary region between the continuous mode and the discontinuous mode of the converters. This may result in overcharging or overdischarging of a battery, unintended torque fluctuations of a vehicle, etc. On the other hand, one possible option to reduce the converter size is to introduce a magnetically coupled converter including a magnetically coupled reactor in which a plurality of coils is magnetically coupled on the same core. In the magnetically coupled converter, the magnetically coupled coils are typically alternately switched at the same duty cycle at regular phase difference intervals (in antiphase) in order to reduce magnetic saturation of the core of the reactor and reduce output current ripple.

However, when the magnetically coupled reactor is controlled in antiphase during operation in the discontinuous mode including the time period in which the current flowing through the coil is zero, namely during operation under low load, the current waveforms become very complicated. Moreover, a reverse current may be generated. Current control is therefore difficult.

The present disclosure was made under the above circumstances, the present disclosure provides a power supply unit capable of reducing the possibility of overcurrent and current shortage.

A power supply unit of the present disclosure is a power supply unit including a power supply and a converter.

The converter is configured to perform at least one operation selected from the group consisting of boosting and stepping down of an output voltage of the power supply.

The converter includes a reactor in which n-phase coils are magnetically coupled to each other (where n is an integer of 2 or more), n-phase switches each connected to a corresponding one of the coils, and a control unit.

The control unit is configured to control duty cycles of the n-phase switches.

The control unit is configured to monitor a current value flowing through the n-phase coils.

The control unit is configured to perform phase switching control when the control unit determines that an operation condition (1) described below is satisfied, the phase switching control being control in which the control unit performs phase switching from in phase to out of phase in a case where the n-phase switches are being driven in phase, and the control unit performs phase switching from out of phase to in phase in a case where the n-phase switches are being driven out of phase.

The operation condition (1) is an operation condition that, in a relationship between an inlet voltage and an outlet voltage of the converter and a current value flowing through a coil, an operation mode is a discontinuous mode in a case where the n-phase switches are being driven in phase when each of the inlet voltage and the outlet voltage of the converter has a predetermined voltage value, and the operation mode is a continuous mode in a case where the n-phase switches are being driven out of phase when each of the inlet voltage and the outlet voltage of the converter has the predetermined voltage value, the discontinuous mode being a mode having a period in which the current value flowing through the coil is zero during one cycle of duty cycle control, and the continuous mode being a mode having no period in which the current value flowing through the coil is zero during one cycle of the duty cycle control.

In the power supply unit of the present disclosure, the control unit may be configured to store in advance a data group showing such a relationship between the inlet voltage and the outlet voltage of the converter and the current value flowing through the coil that satisfies the operation condition (1).

The control unit may be configured to determine whether the operation condition (1) is satisfied, based on the inlet voltage and the outlet voltage of the converter and the current value flowing through the n-phase coils.

In the power supply unit of the present disclosure, the control unit may be configured to perform the phase switching control at a timing when the current value flowing through the coil matches an average current value of the coil, when the control unit determines that the operation condition (1) is satisfied.

In the power supply unit of the present disclosure, the control unit may be configured to, when the current value flowing through the coil is increasing before phase switching from in phase to out of phase in the phase switching control, perform the phase switching from in phase to out of phase and then perform phase switching from out of phase to in phase in such a way that the current value flowing through the coil increases after the phase switching from out of phase to in phase.

In the power supply unit of the present disclosure, the control unit may be configured to, when the current value flowing through the coil is decreasing before phase switching from in phase to out of phase in the phase switching control, perform the phase switching from in phase to out of phase and then perform phase switching from out of phase to in phase in such a way that the current value flowing through the coil decreases after the phase switching from out of phase to in phase.

In the power supply unit of the present disclosure, the out of phase may be a phase difference of $(360/n)°$.

In the power supply unit of the present disclosure, n-phases are two phases, and the out of phase may be a phase difference of 180°.

In the power supply unit of the present disclosure, the power supply may be a fuel cell.

In the power supply unit of the present disclosure, the control unit may be configured to perform phase switching from out of phase to in phase when the control unit determines that the current value flowing through the coil is equal to or less than a predetermined first switching threshold value in the phase switching control.

The control unit may be configured to perform phase switching from in phase to out of phase when the control unit determines that the current value flowing through the coil is equal to or larger than a predetermined second switching threshold value that is larger than the predetermined first switching threshold value in the phase switching control.

The power supply unit of the present disclosure can reduce the possibility of overcurrent and current shortage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
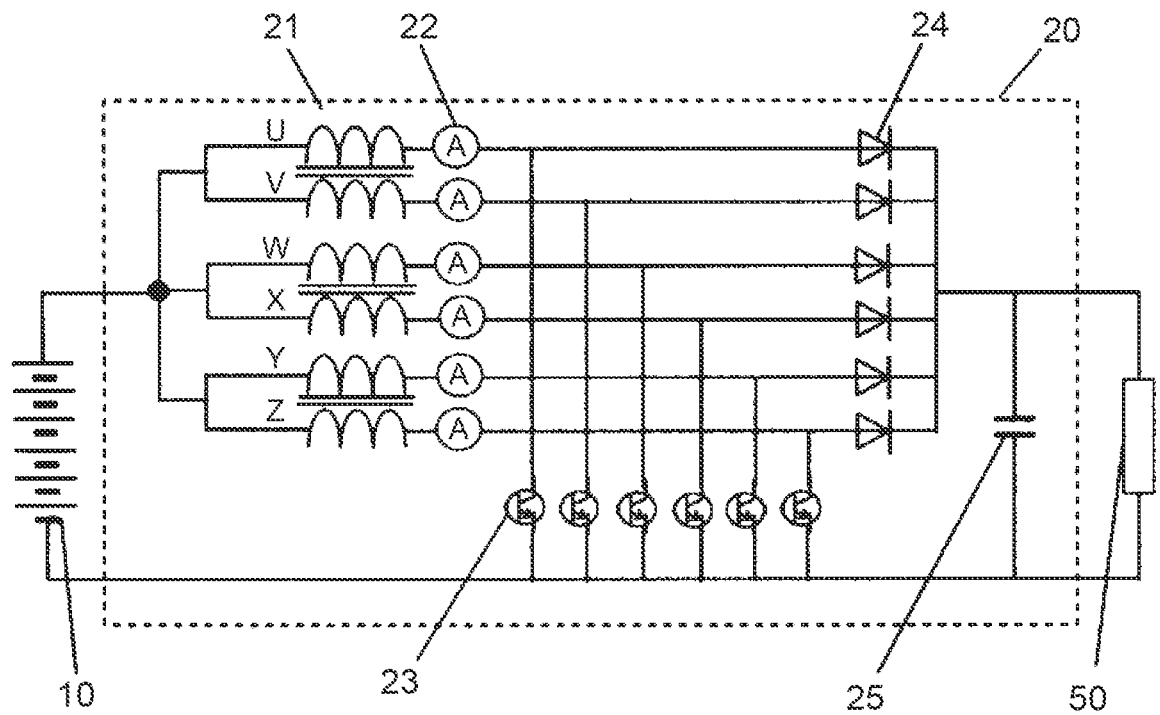
FIG. 1 shows an example of a circuit configuration of a power supply unit including a boost converter and peripheral components.

A power supply unit of the present disclosure is a power supply unit including a power supply and a converter.

The converter is configured to perform at least one operation selected from the group consisting of boosting and stepping down of an output voltage of the power supply.

The converter includes a reactor in which n-phase coils are magnetically coupled to each other (where n is an integer of 2 or more), n-phase switches each connected to a corresponding one of the coils, and a control unit.

The control unit is configured to control duty cycles of the n-phase switches.

The control unit is configured to monitor a current value flowing through the n-phase coils.

The control unit is configured to perform phase switching control when the control unit determines that an operation condition (1) described below is satisfied, the phase switching control being control in which the control unit performs phase switching from in phase to out of phase in the case where the n-phase switches are being driven in phase, and the control unit performs phase switching from out of phase to in phase in the case where the n-phase switches are being driven out of phase.

The operation condition (1) is an operation condition that, in the relationship between an inlet voltage and an outlet voltage of the converter and a current value flowing through a coil, the operation mode is a discontinuous mode in the case where the n-phase switches are being driven in phase when each of the inlet voltage and the outlet voltage of the converter has a predetermined voltage value, and the operation mode is a continuous mode in the case where the n-phase switches are being driven out of phase when each of the inlet voltage and the outlet voltage of the converter has the predetermined voltage value, the discontinuous mode being a mode having a period in which the current value flowing through the coil is zero during one cycle of duty cycle control, and the continuous mode being a mode having no period in which the current value flowing through the coil is zero during one cycle of the duty cycle control.

In JP 2020-088971 A, whether the current operation mode is the continuous mode or the discontinuous mode is determined based on either the feed forward term for the discontinuous mode calculated based on the inductance of a reactor, the carrier frequency, the inlet voltage of the converter, and the outlet voltage of the converter or the feed forward term for the continuous mode calculated based on the inlet voltage of the converter and the outlet voltage of the converter, whichever is smaller. However, the control unit may not be able to correctly recognize the boundary between the continuous mode and the discontinuous mode, for example, when the inductance of the reactor deviates from a target value due to product variations etc. or when there are measurement variations in sensor values such as the inlet voltage of the converter and the outlet voltage of the converter.

That is, the technique of JP 2020-088971 A is "to somehow find the moment when the circuit operation switches from the discontinuous mode to the continuous mode or from the continuous mode to the discontinuous mode and perform control accordingly." The control is therefore "passive" with respect to the circuit operation.

The circuit operation is continuous (no interruption in time) because it is a physical phenomenon. On the other hand, the control is intermittent (with interruptions in time) because a control unit such as microcomputer operates at specific time intervals.

Therefore, in principle, the following situation necessarily occurs no matter what high-speed control unit, control method, etc. are used. The circuit operation was in the discontinuous mode at one moment, but is already in the discontinuous mode the next moment the control unit recognizes the mode. Namely, the control unit cannot accurately follow and recognize the actual mode. In this case, although the circuit was switched from the discontinuous mode to the continuous mode at some point in the elapsed period, the control unit was not able to recognize the switching of the mode and tries to perform control using the duty cycle for the discontinuous mode.

Although the circuit is in the continuous mode, the control unit mistakenly recognizes that the circuit is in the discontinuous mode, and sets the duty cycle to a high value. This causes an overcurrent. On the other hand, although the circuit is in the discontinuous mode, the control unit mistakenly recognizes that the circuit is in the continuous mode, and sets the duty cycle to a low value. This causes a current shortage. As a result, overcharging or overdischarging of the battery, unintended torque fluctuations of the vehicle, etc. may occur.

The circuit of a magnetically coupled converter has a dead zone in which a current does not increase in proportion to the duty under low load. In order to avoid the dead zone, the duty is controlled in phase under low load, and the duty is controlled out of phase under high load.

In the present disclosure, the circuit operation of the converter can be determined by control, and switching between the continuous mode and the discontinuous mode can be actively and accurately performed. Therefore, switching between the continuous mode and the discontinuous mode will not just occur, and the duty that does not match the operation of the circuit will not be output. The possibility of overcurrent and current shortage is thus reduced.

FIG. 1 shows an example of a circuit configuration of a power supply unit including a boost converter and peripheral components.

The power supply unit shown in FIG. 1 is mounted on, for example, a vehicle, and a drive motor for the vehicle that is an external load 50 is connected to the power supply unit via an inverter. Although not shown in the figure, a battery may be provided in parallel with a fuel cell 10 and a boost converter 20. The output power of the fuel cell 10 is boosted by the boost converter 20, and is then converted from direct current to alternating current by the inverter and supplied to the motor.

The boost converter 20 includes six-phase boost circuits connected in parallel with each other. Although FIG. 1 shows a configuration including six-phase booster circuits, the number of phases is not particularly limited.

The booster circuit includes a reactor 21, a current sensor 22, a switch 23, a diode 24, and a capacitor 25. The booster circuit may include an input voltage sensor and an output voltage sensor.

Of the six-phase booster circuits, every two-phase booster circuits share the core of one reactor 21 and can be magnetically coupled to each other. In each booster circuit, a current flowing through the reactor 21 increases when the switch 23 is turned on, and decreases when the switch 23 is turned off, and a zero current is maintained when the current reaches zero. The current sensor 22 acquires a current value flowing through the reactor 21.

A control unit, not shown, controls the boost ratio of the boost converter 20 and the output current value from the fuel cell 10 by controlling on and off of the switches 23.

The output power of the fuel cell 10 greatly changes depending on the requests from the vehicle (speed, acceleration, amount of load, road slope, etc.), and the output current of the fuel cell 10 also greatly changes accordingly. When the output current of the fuel cell 10 is large, passing this output current through one booster circuit increases heat generation, so that the power conversion efficiency of the boost converter 20 decreases. Even when a small current is passed through the booster circuit that can withstand a large current, energy loss increases and the power conversion efficiency of the boost converter 20 decreases. The boost converter 20 therefore includes multi-phase boost circuits (6 phases in the example shown in FIG. 1), and the boost converter 20 switches the number of phases to drive according to the output current value of the fuel cell 10. For example, two phases are driven when the output current value of the fuel cell 10 is 0 to 150 A, four phases are driven when the output current value of the fuel cell 10 is 150 to 300 A, and six phases are driven when the output current value of the fuel cell 10 is 300 to 600 A. The efficiency of the booster circuit varies depending on the current flowing through the booster circuit. By changing the number of phases to drive, the booster circuit can be operated with the optimum efficiency in each current range.

The power supply unit includes a power supply and a converter.

The power supply unit of the present disclosure may be a system mounted and used on a vehicle such as fuel cell electric vehicle.

The power supply may be a fuel cell, a battery, etc.

When the power supply is a fuel cell, the power supply unit of the present disclosure may be a fuel cell system.

The fuel cell may include only one single cell, or may be a fuel cell stack that is a stack of multiple single cells.

The converter performs at least one operation selected from the group consisting of boosting and stepping down of the output voltage of the power supply. The converter may be a boost converter, a buck converter, or a buck-boost converter.

The converter may be a DC-to-DC converter.

The converter includes a reactor in which n-phase coils are magnetically coupled to each other (where n is an integer of 2 or more), n-phase switches each connected to a corresponding one of the coils, and a control unit. The converter may include a diode, a current sensor, a voltage sensor, a photocoupler, and a capacitor.

The reactor has a coil and a core.

In the reactor, n-phase coils (n is an integer of 2 or more) may be wound around the core. More specifically, n may any integer of 2 or more, and the upper limit of n is not particularly limited, and may be 10 or less, 5 or less, 4 or less, or 3 or less.

The core and coil of the reactor may be a core and coil that are used in conventionally known reactors.

In the present disclosure, a reactor including a core with a single-phase independent coil wound therearound is referred to as a non-magnetically coupled reactor. In the present disclosure, a converter including a non-magnetically coupled reactor is referred to as a non-magnetically coupled converter.

In the present disclosure, a reactor including a core with two or more-phase independent coils wound therearound is referred to as a magnetically coupled reactor. In the present disclosure, a converter including a magnetically coupled reactor is referred to as a magnetically coupled converter.

In the present disclosure, an independent coil means a coil including one or more winding portions and two terminal portions.

A switch (switching element) is composed of a transistor and a protection diode. The transistor is an NPN transistor and is, for example, an insulated gate bipolar transistor (IGBT), a power metal oxide semiconductor (MOS) transistor, or a power bipolar transistor.

The diode may be a diode used in conventionally known converters.

The current sensor is not particularly limited as long as it can acquire the current value I flowing through the coil of the reactor (this current value is sometimes referred to as the reactor current value). The current sensor may be a conventionally known ammeter etc. In the present disclosure, the reactor average current means the average current flowing through the coil during one cycle of duty cycle control.

The voltage sensor is not particularly limited as long as it can acquire the input voltage output from the power supply and input to the converter. The voltage sensor may be a conventionally known voltmeter etc.

The control unit may be an electronic control unit (ECU), a microcomputer, etc. The ECU includes a central processing unit (CPU), a memory, and an input and output buffer.

The control unit detects the current value flowing through the n-phase coils of the reactor according to a signal from the current sensor, and monitors the current value flowing through the n-phase coils of the reactor.

The control unit controls on and off of the n-phase switches to control the duty cycles of the n-phase switches.

The control unit may operate the magnetically coupled n-phase switches at a fixed frequency. The control unit may control the duty cycles of the n-phase switches by periodically switching between an ON command and an OFF command to the switches. The control unit may operate the n-phase switches at the same duty cycle. The control unit may operate the n-phase switches at slightly different duty cycles from each other.

Each duty cycle is set so that the duty cycle when the switches are driven in phase is different from the duty cycle when the switches are driven out of phase.

Each duty cycle is not particularly limited as long as the duty cycle when the switches are driven in phase is different from the duty cycle when the switches are driven out of phase. Each duty cycle can be set as appropriate according to the output request from a load etc.

In the boost converter, the operation of one cycle of duty cycle control in which electrical energy is stored in and released from the reactor is repeated to boost the voltage.

The duty cycle determines the ratio of the storage period during which the switching element is open and electrical energy is stored in the reactor to one cycle of the duty cycle control of the boosting operation. The duty cycle D is given by $D=T_{ON}/T$, where T represents one cycle of the duty cycle control of the boosting operation of the boost converter, $T_{ON}$ represents the period during which the switching element is on, and $T_{OFF}$ represents the period during which the switching element is off.

In the present disclosure, one cycle of duty cycle control means a switching period of a switch. The switching period of a switch means the period from when the switch is turned on until the switch is turned back on.

Typical Example

The control unit performs phase switching control when the control unit determines that an operation condition (1) described below is satisfied, the phase switching control being control in which the control unit performs phase switching from in phase to out of phase in the case where the n-phase switches are being driven in phase, and the control unit performs phase switching from out of phase to in phase in the case where the n-phase switches are being driven out of phase.

The operation condition (1) is an operation condition that, in the relationship between the inlet voltage and the outlet voltage of the converter and the current value flowing through the coil, an operation mode is a discontinuous mode in the case where the n-phase switches are being driven in phase when each of the inlet voltage and the outlet voltage of the converter has a predetermined voltage value, and the operation mode is the continuous mode in the case where the n-phase switches are being driven out of phase when each of the inlet voltage and the outlet voltage of the converter has the predetermined voltage value, the discontinuous mode being a mode having a period in which the current value flowing through the coil is zero during one cycle of the duty cycle control, and the continuous mode being a mode having no period in which the current value flowing through the coil is zero during one cycle of the duty cycle control.

Whether the operation condition (1) is satisfied may be determined from the input voltage with respect to the set output voltage and the current value flowing through the coil (reactor current value).

The predetermined voltage value of the input voltage is determined according to the output from the power supply.

The predetermined voltage value of the output voltage is set as appropriate according to a request from a load such as a motor of a vehicle.

The control unit may constantly and repeatedly determine whether the operation condition (1) is satisfied, may determine at a predetermined timing whether the operation condition (1) is satisfied, or may determine once every predetermined cycles (e.g., once every four to ten cycles) whether the operation condition (1) is satisfied.

When the control unit operates the n-phase switches out of phase, the control unit may operate the n-phase switches with a phase difference of $(360/n)°$.

When the n-phase switches are two-phase switches and the control unit operates the two-phase switches out of phase, the control unit may operate the two-phase switches with a phase difference of 30 to 180°, or for improved power conversion efficiency, may operate the two-phase switches with a phase difference of 180°, that is, in antiphase. When the control unit operates the switches in antiphase, a phase error in the range of −5° to +5° may occur.

Description of Continuous Mode and Discontinuous Mode

Figure 2:
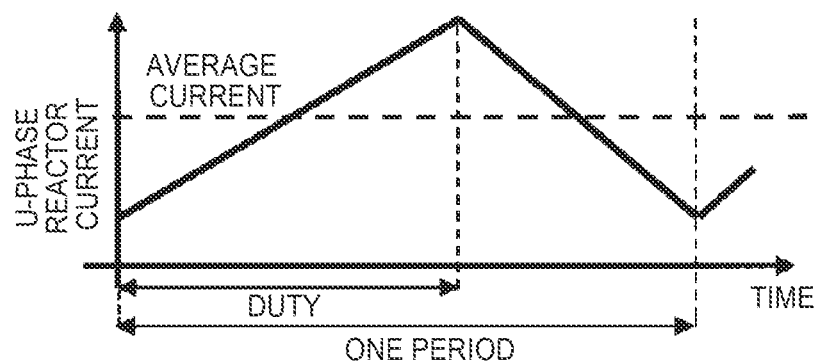
FIG. 2 shows an example of a current waveform when a current flowing through a coil of a reactor of the boost converter is in the continuous mode.

FIG. 2 shows an example of a current waveform when a current flowing through the coil of the reactor of the boost converter is in the continuous mode.

Figure 3:
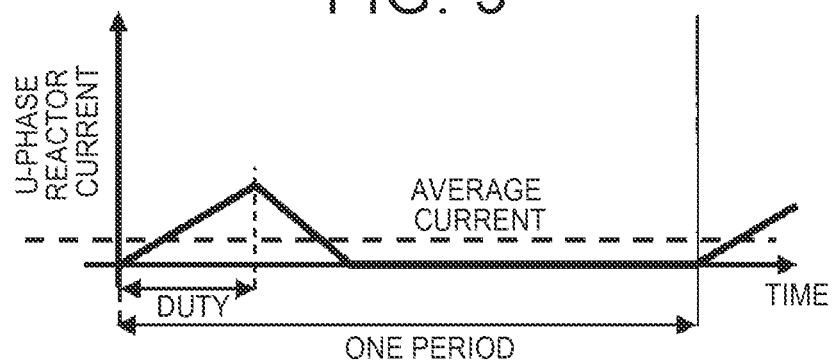
FIG. 3 shows an example of a current waveform when a current flowing through the coil of the reactor of the boost converter is in the discontinuous mode.

FIG. 3 shows an example of a current waveform when a current flowing through the coil of the reactor of the boost converter is in the discontinuous mode.

As shown in FIG. 2, a current flowing through the coil of the reactor of the boost converter (reactor current) has a triangular wave according to the switching operation, and the median of the triangular wave is the reactor average current (hereinafter referred to as the average current). As the duty is reduced to lower the average current, the lowest point of the triangular wave reaches 0 A. As the average current is further lowered, a period during which the reactor current is zero begins to occur as shown in FIG. 3. The operation in which there is a period in which the current flowing through the coil of the reactor is zero during one cycle of the duty cycle control of the converter is called discontinuous mode. The operation in which there is no period in which the current flowing through the coil of the reactor is zero during one cycle of the duty cycle control of the converter is called continuous mode.

Description of In-Phase Driving and Antiphase Driving

Figure 4:
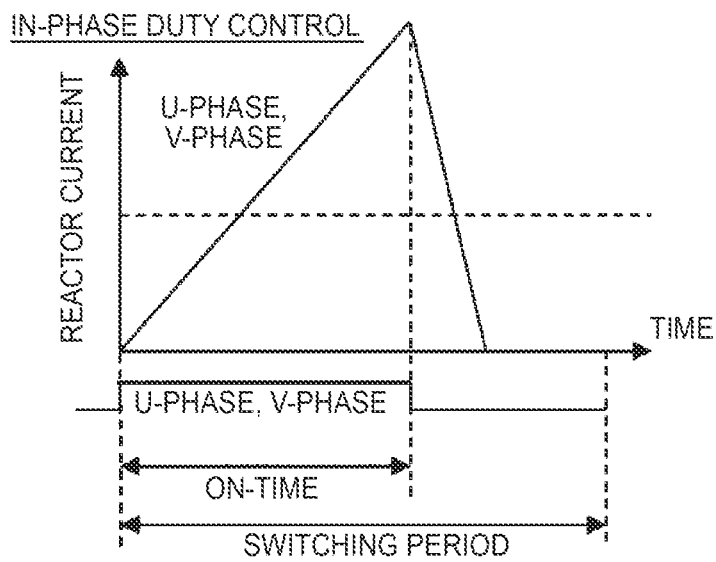
FIG. 4 shows an example of current waveforms when two-phase switches for a magnetically coupled reactor having two-phase coils, namely a U-phase coil and a V-phase coil, in a boost converter are driven in phase (in-phase duty control)

FIG. 4 shows an example of current waveforms when two-phase switches for a magnetically coupled reactor having two-phase coils, namely a U-phase coil and a V-phase coil, in a boost converter are driven in phase (in-phase duty control).

The in-phase driving is implemented by controlling the U-phase and V-phase switches on and off at the same time at the same duty cycle.

Figure 5:
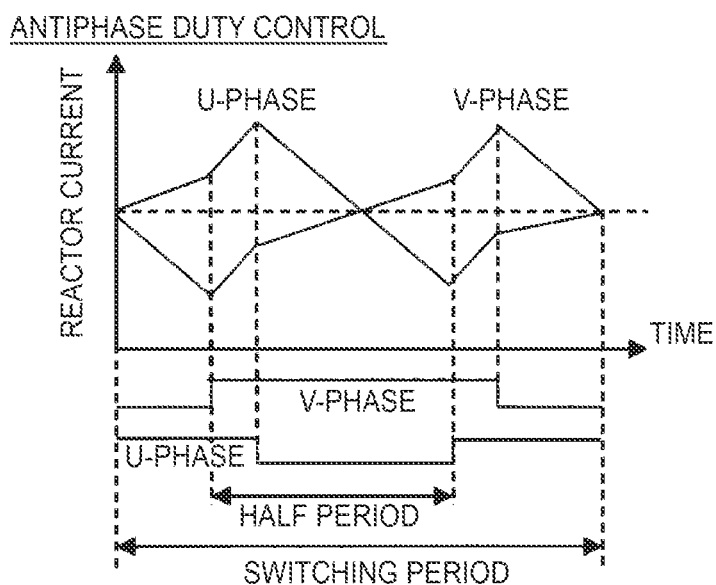
FIG. 5 shows an example of current waveforms when two-phase switches for a magnetically coupled reactor having two-phase coils, namely a U-phase coil and a V-phase coil, in a boost converter are driven in antiphase (antiphase duty control)

FIG. 5 shows an example of current waveforms when two-phase switches for a magnetically coupled reactor having two-phase coils, namely a U-phase coil and a V-phase coil, in a boost converter are driven in antiphase (antiphase duty control).

The antiphase driving is implemented by controlling the U-phase and V-phase switches on and off at the same duty cycle with the switching period (driving period) shifted by half the period from each other. The reactor current during the antiphase driving has a smaller amplitude than the reactor current during the in-phase driving.

The control unit may store in advance a data group showing such a relationship between the inlet voltage and outlet voltage of the converter and the current value flowing through the coil that satisfies the operation condition (1), and may determine whether the operation condition (1) is satisfied from the inlet voltage and outlet voltage of the converter and the current value flowing through the n-phase coil by referring to the data group.

Figure 6:
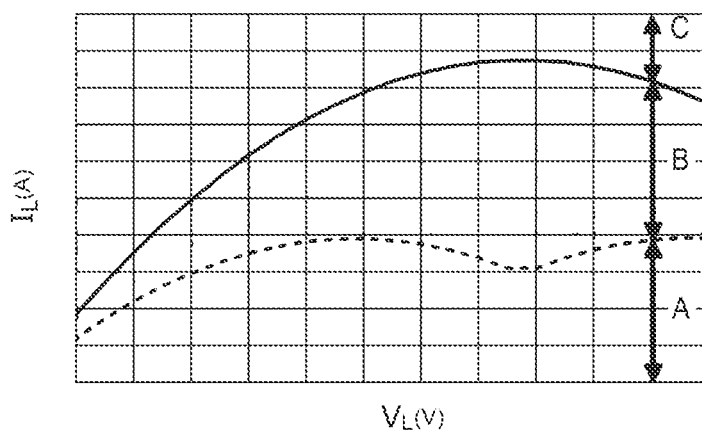
FIG. 6 is a graph showing the relationship between the inlet voltage of a converter including a magnetically coupled reactor having two-phase coils and the current value flowing through the coil when the outlet voltage of the converter is constant.

The operation condition in which the operation mode is the discontinuous mode in in-phase driving and the continuous mode in out-of-phase driving is such an operation condition as given by the following expression (1) and (2) in, for example, the boost converter. This operation condition is as shown in FIG. 6. The data given by the expressions (1) and (2), FIG. 6, etc. may be stored in advance as the data group. Even when the converter is a buck converter or a buck-boost converter, a data group similar to that stored in advance when the converter is a boost converter may be stored in advance.

FIG. 6 is a graph showing the relationship between the inlet voltage of a converter including a magnetically coupled reactor having two-phase coils and the current value flowing through the coil when the outlet voltage of the converter is constant. In FIG. 6, $V_L$ represents the input voltage (voltage before boosting), and $I_L$ represents the reactor average current.

The meanings of regions A to C shown in FIG. 6 are as follows.
- A: Region that is in the discontinuous mode in both in-phase driving and antiphase driving.
- B: Switchable region (region that is in the continuous mode in antiphase driving and in the discontinuous mode in in-phase driving)
- C: Region that is in the continuous mode in both in-phase driving and antiphase driving The switchable region B shown in FIG. 6 is a region satisfying the operation condition (1). Accordingly, in the typical example of the present disclosure, the phase switching control may be performed every time the switchable region of B is entered.

$$-\frac{LV_L - LV_H + MV_L}{L^2 - M^2} \cdot \frac{V_L}{2V_H} T < I_L < \frac{V_L}{2V_H} \cdot \frac{(V_H - V_L)}{(L - M)} T \quad \text{Expression (1)}$$

$$\frac{LV_L + MV_L - MV_H}{L^2 - M^2} \cdot \frac{(V_H - V_L)}{2V_H} T < I_L < \frac{V_L}{2V_H} \cdot \frac{(V_H - V_L)}{(L - M)} T \quad \text{Expression (2)}$$

The expression (1) is an inequality showing the relationship between the inlet voltage and outlet voltage of the boost converter and the current value flowing through the coil when the boost ratio is 2 or more. The left side of the inequality of the expression (1) is a current curve of the lower limit value of the region when the boost ratio is 2 or more, and this current curve is shown by a dashed line in FIG. 6. The right side of the inequality of the expression (1) is a current curve of the upper limit value of the region when the boost ratio is 2 or more, and this current curve is shown by a continuous line in FIG. 6.

The expression (2) is an inequality showing the relationship between the inlet voltage and outlet voltage of the boost converter and the current value flowing through the coil when the boost ratio is less than 2. The left side of the inequality of the expression (2) is a current curve of the lower limit value of the region when the boost ratio is less than 2, and this current curve is shown by a dashed line in FIG. 6. The right side of the inequality of the expression (2) is a current curve of the upper limit value of the region when the boost ratio is less than 2, and this current curve is shown by a continuous line in FIG. 6.

In the expressions (1) and (2), $V_L$ represents the input voltage (voltage before boosting), $I_L$ represents the reactor average current, $V_H$ represents the output voltage (voltage after boosting), M represents the reactor mutual inductance, L represents the reactor self-inductance, and T represents the switching period.

Specific Example

In the phase switching control, the control unit may perform phase switching from out of phase to in phase when it determines that the current value flowing through the coil is equal to or less than a predetermined first switching threshold value, and may perform phase switching from in phase to out of phase when it determines that the current value flowing through the coil is equal to or larger than a predetermined second switching threshold value that is larger than the predetermined first switching threshold value.

Figure 7:
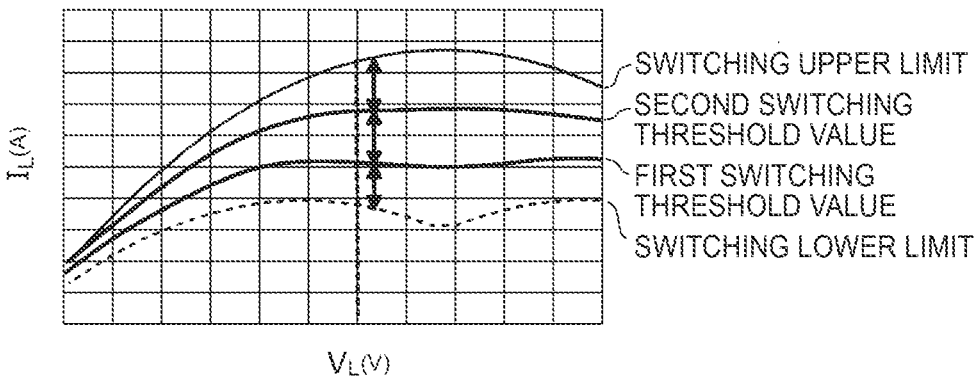
FIG. 7 is the graph shown in FIG. 6, illustrating switching threshold values.

FIG. 7 is the graph shown in FIG. 6, illustrating the switching threshold values.

For example, as shown in FIG. 7, values that divide the switchable region surrounded by the switching upper limit value and the switching lower limit value into three equal parts for any input voltage $V_L$ are calculated. The first switching threshold value may be set to the value closer to the switching lower limit out of the calculated values, and the second switching threshold value may be set to the value closer to the switching upper limit out of the calculated values.

When the control unit determines that the reactor average current $I_L$ is equal to or less than the first switching threshold value, the control unit may perform phase switching from out of phase to in phase.

On the other hand, when the control unit determines that the reactor average current $I_L$ is equal to or larger than the second switching threshold value, the control unit may perform phase switching from in phase to out of phase.

With these settings, phase switching does not occur frequently, and the control is robust against product variations.

Such first and second switching threshold values may be calculated in advance for desired output voltages $V_H$ and desired switching periods T, and may be stored in advance as a data group.

In the example shown in FIG. 7, the difference between the first switching threshold value and the second switching threshold value is one-third of the difference between the switching upper limit value and the switching lower limit value. However, the difference between the first switching threshold value and the second switching threshold value may be larger than this. For example, the difference between the first switching threshold value and the second switching threshold value may be one-half the difference between the switching upper limit value and the switching lower limit value, or may be two-thirds of the difference between the switching upper limit value and the switching lower limit value. The first switching threshold value may be set to the switching lower limit value, and the second switching threshold value may be set to the switching upper limit value. When the difference between the switching upper limit value and the switching lower limit value is large, the phase switching is less likely to occur frequently.

In the example shown in FIG. 7, the difference between the switching upper limit value and the second switching threshold value and the difference between the first switching threshold value and the switching lower limit value are one-third of the difference between the switching upper limit value and the switching lower limit value. However, the difference between the switching upper limit value and the second switching threshold value and the difference between the first switching threshold value and the switching lower limit value may be larger than one-third of the difference between the switching upper limit value and the switching lower limit value as long as there is a difference between the first switching threshold value and the second switching threshold value, namely as long as the difference between the switching upper limit value and the second switching threshold value and the difference between the first switching threshold value and the switching lower limit value is less than one-half the difference between the switching upper limit value and the switching lower limit value. For example, the difference between the switching upper limit value and the second switching threshold value and the difference between the first switching threshold value and the switching lower limit value may be two-fifths or three-sevenths of the difference between the switching upper limit value and the switching lower limit value. By making the difference between the switching upper limit value and the second switching threshold value and the difference between the first switching threshold value and the switching lower limit value as large as possible within the range of less than one-half of the difference between the switching upper limit value and the switching lower limit value, the phase switching control can be performed even when the switching upper limit value decreases or the switching lower limit value increases due to an error of the output voltage sensor, an error of the input voltage sensor, a variation in reactor self-inductance L, a variation in reactor mutual inductance M, etc.

In the example shown in FIG. 7, the difference between the switching upper limit value and the second switching threshold value is equal to the difference between the first switching threshold value and the switching lower limit value. However, the difference between the switching upper limit value and the second switching threshold value may be larger than the difference between the first switching threshold value and the switching lower limit value. In this case, the drive time in antiphase with high power conversion efficiency can be increased. The overall power conversion efficiency can therefore be improved.

First Modification

When the control unit determines that the operation condition (1) is satisfied, the control unit may perform the phase switching control at the timing when the current value flowing through the coil matches the average current value of the coil (reactor average current value).

In a first modification of the present disclosure, since the average current value flowing through the coil of the reactor does not change (namely, there is no change in output) before and after switching between out of phase and in phase, the influence of the phase switching on the behavior of the vehicle etc. can be reduced.

Figure 8:
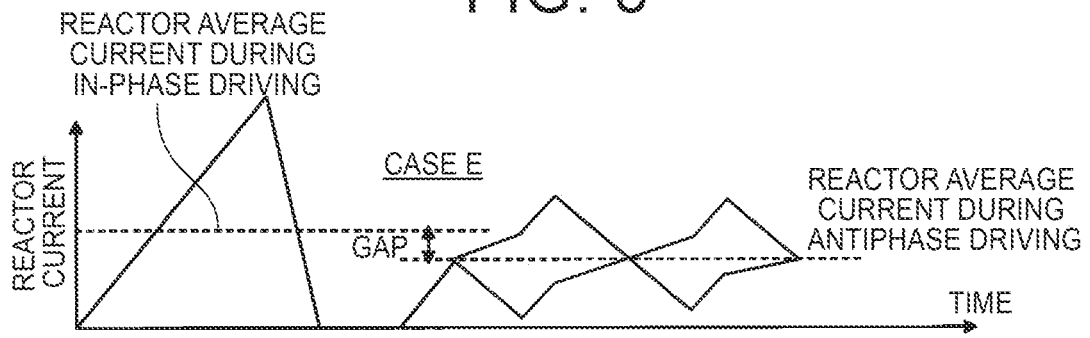
FIG. 8 shows an example of the relationship between the time and the reactor current when phase switching control from in-phase driving to antiphase driving is performed at the timing when the current value flowing through the coil (reactor current value) does not match a reactor average current value in a converter including a magnetically coupled reactor having two-phase coils.

FIG. 8 shows an example of the relationship between the time and the reactor current when phase switching control from in-phase driving to antiphase driving is performed at the timing when the current value flowing through the coil (reactor current value) does not match the reactor average current value in a converter including a magnetically coupled reactor having two-phase coils.

Figure 9:
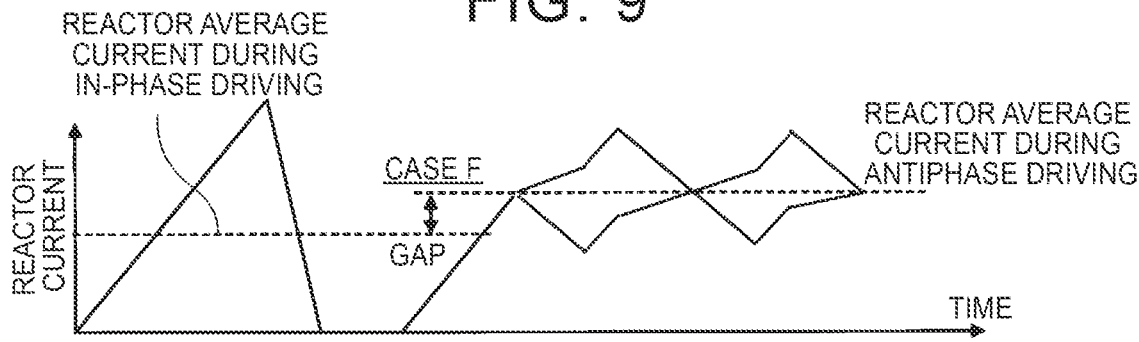
FIG. 9 shows another example of the relationship between the time and the reactor current when phase switching control from in-phase driving to antiphase driving is performed at the timing when the current value flowing through the coil (reactor current value) does not match the reactor average current value in a converter including a magnetically coupled reactor having two-phase coils.

FIG. 9 shows another example of the relationship between the time and the reactor current when phase switching control from in-phase driving to antiphase driving is performed at the timing when the current value flowing through the coil (reactor current value) does not match the reactor average current value in a converter including a magnetically coupled reactor having two-phase coils.

As shown in FIGS. 8 to 9, in the case of the typical example and the specific example, the current value flowing through the coil of each phase changes as shown by the gap in cases E and F in FIGS. 8 and 9 when the phase switching is performed at bad timing.

This means that the output from the power supply is disturbed. When the output exceeds its allowable value, the battery may be overcharged or overdischarged, or the vehicle behavior may change through torque fluctuations of the drive motor.

Figure 10:
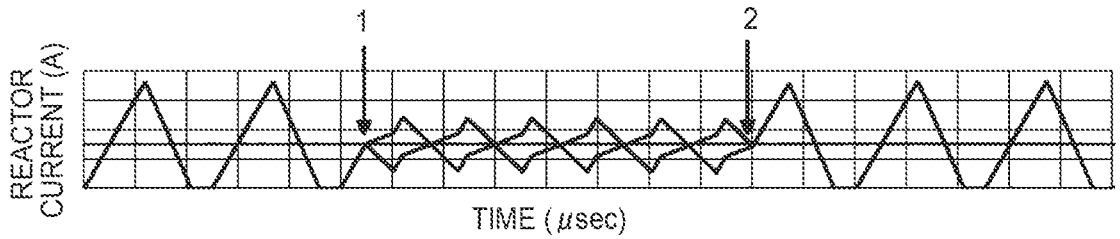
FIG. 10 shows an example of the relationship between the time and the reactor current when phase switching control from in-phase driving to antiphase driving is performed at the timing when the current value flowing through the coil matches the reactor average current value and then phase switching control from antiphase driving to in-phase driving is performed at the timing when the current value flowing through the coil matches the reactor average current value in a converter including a magnetically coupled reactor having two-phase coils.

FIG. 10 shows an example of the relationship between the time and the reactor current when phase switching control from in-phase driving to antiphase driving is performed at the timing when the current value flowing through the coil matches the reactor average current value and then phase switching control from antiphase driving to in-phase driving is performed at the timing when the current value flowing through the coil matches the reactor average current value in a converter including a magnetically coupled reactor having two-phase coils.

As shown by an arrow 1 in FIG. 10, the phase switching control from in-phase driving to antiphase driving is performed at the timing when the current value flowing through the coil matches the reactor average current value. As shown by an arrow 2 in FIG. 10, the phase switching control from antiphase driving to in-phase driving is performed at the timing when the current value flowing through the coil matches the reactor average current value. This configuration can reduce a change in average current value of the reactor in the range including an antiphase operation period and in-phase operation periods before and after the antiphase operation period. Since the average reactor current value does not change (namely, there is no change in output of the power supply) before and after the phase switching, the influence of the phase switching on the behavior of the vehicle etc. can be reduced.

Second Modification

When the current value flowing through the coil is increasing before phase switching from in phase to out of phase in the phase switching control, the control unit may perform the phase switching from in phase to out of phase and then perform phase switching from out of phase to in phase in such a way that the current value flowing through the coil increases after the phase switching from out of phase to in phase.

On the other hand, when the current value flowing through the coil is decreasing before phase switching from in phase to out of phase in the phase switching control, the control unit may perform the phase switching from in phase to out of phase and then perform phase switching from out of phase to in phase in such a way that the current value flowing through the coil decreases after the phase switching from out of phase to in phase.

The configuration of a second modification of the present disclosure can reduce a change in average current value flowing through the coil of the reactor in the range including an out-of-phase operation period and in-phase operation periods before and after the out-of-phase operation period. Since the average current value flowing through the coil of the reactor does not change (namely, there is no change in output) before and after the phase switching, the influence of the phase switching on the behavior of the vehicle etc. can be reduced.

Figure 11:
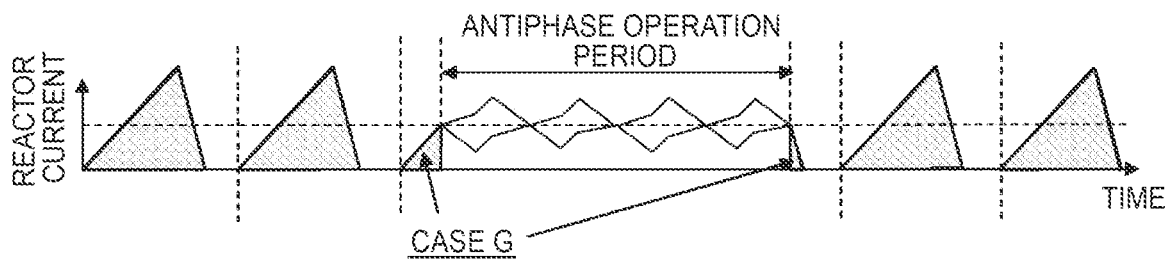
FIG. 11 shows an example of the relationship between the time and the reactor current when phase switching from in phase to antiphase is performed when the current value flowing through the coil is increasing before the phase switching from in phase to antiphase, and then phase switching from antiphase to in phase is performed so that the current value flowing through the coil decreases after the phase switching from antiphase to in phase in a converter including a magnetically coupled reactor having two-phase coils.

FIG. 11 shows an example of the relationship between the time and the reactor current when phase switching from in phase to antiphase is performed when the current value flowing through the coil is increasing before the phase switching from in phase to antiphase, and then phase switching from antiphase to in phase is performed so that the current value flowing through the coil decreases after the phase switching from antiphase to in phase in a converter including a magnetically coupled reactor having two-phase coils.

As shown in case G of FIG. 11, the reactor average current during one period of the in-phase driving immediately before and immediately after the antiphase driving is smaller than the reactor average cycle during one period of in-phase driving before the in-phase driving immediately before the antiphase driving and the reactor average current during one period of in-phase driving after the in-phase driving immediately after the antiphase driving, and the reactor current is disturbed by the phase switching.

Figure 12:
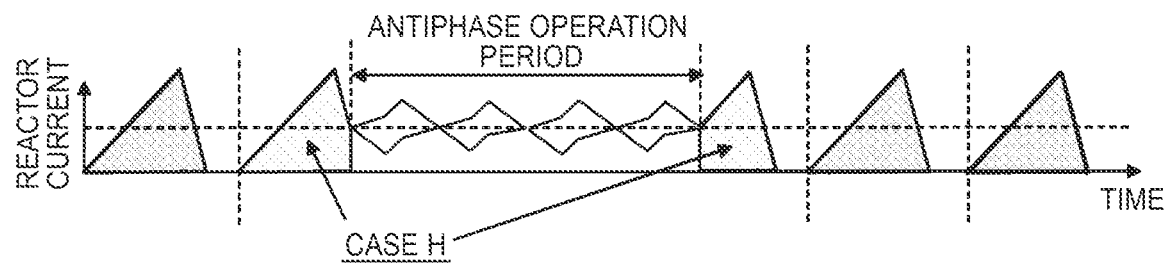
FIG. 12 shows an example of the relationship between the time and the reactor current when phase switching from in phase to antiphase is performed when the current value flowing through the coil is decreasing before the phase switching from in phase to antiphase, and then phase switching from antiphase to in phase is performed so that the current value flowing through the coil increases after the phase switching from antiphase to in phase in a converter including a magnetically coupled reactor having two-phase coils.

FIG. 12 shows an example of the relationship between the time and the reactor current when phase switching from in phase to antiphase is performed when the current value flowing through the coil is decreasing before the phase switching from in phase to antiphase, and then phase switching from antiphase to in phase is performed so that the current value flowing through the coil increases after the phase switching from antiphase to in phase in a converter including a magnetically coupled reactor having two-phase coils.

As shown in case H of FIG. 12, the reactor average current during one period of the in-phase driving immediately before and immediately after the antiphase driving is larger than the reactor average cycle during one period of in-phase driving before the in-phase driving immediately before the antiphase driving and the reactor average current during one period of in-phase driving after the in-phase driving immediately after the antiphase driving, and the reactor current is disturbed by the phase switching.

As shown in FIGS. 11 to 12, in the case of the typical example, the specific example, and the first modification, the current value flowing through the coil of each phase changes as shown in cases G and H in FIGS. 11 and 12 when the phase switching is performed at bad timing. Like cases E and F, cases G and H also mean that the output from the power supply is disturbed. When the output exceeds its allowable value, the battery may be overcharged or overdischarged, or the vehicle behavior may change through torque fluctuations of the drive motor.

Figure 13:
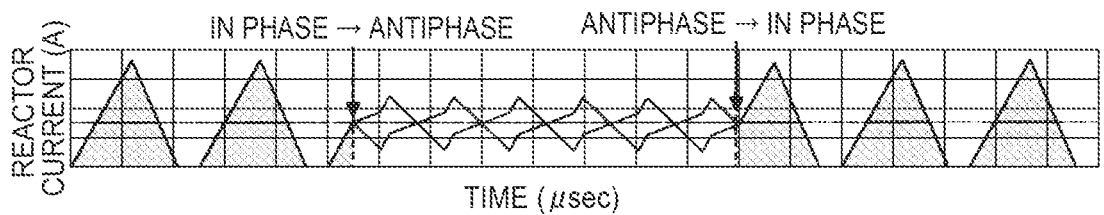
FIG. 13 shows an example of the relationship between the time and the reactor current when phase switching from in phase to antiphase is performed when the current value flowing through the coil is increasing before the phase switching from in phase to antiphase, and then phase switching from antiphase to in phase is performed so that the current value flowing through the coil increases after the phase switching from antiphase to in phase in a converter including a magnetically coupled reactor having two-phase coils.

FIG. 13 shows an example of the relationship between the time and the reactor current when phase switching from in phase to antiphase is performed when the current value flowing through the coil is increasing before the phase switching from in phase to antiphase, and then phase switching from antiphase to in phase is performed so that the current value flowing through the coil increases after the phase switching from antiphase to in phase in a converter including a magnetically coupled reactor having two-phase coils.

Figure 14:
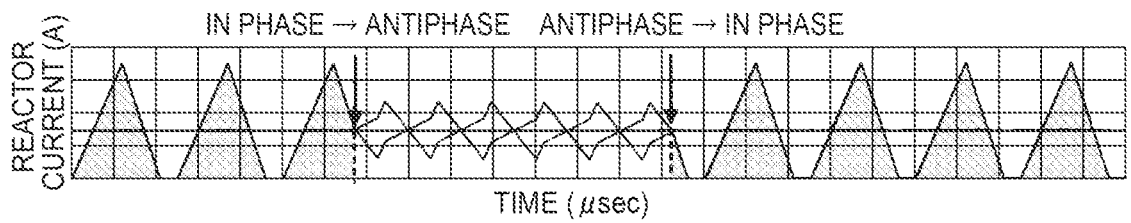
FIG. 14 shows an example of the relationship between the time and the reactor current when phase switching from in phase to antiphase is performed when the current value flowing through the coil is decreasing before the phase switching from in phase to antiphase, and then phase switching from antiphase to in phase is performed so that the current value flowing through the coil decreases after the phase switching from antiphase to in phase in a converter including a magnetically coupled reactor having two-phase coils.

FIG. 14 shows an example of the relationship between the time and the reactor current when phase switching from in phase to antiphase is performed when the current value flowing through the coil is decreasing before the phase switching from in phase to antiphase, and then phase switching from antiphase to in phase is performed so that the current value flowing through the coil decreases after the phase switching from antiphase to in phase in a converter including a magnetically coupled reactor having two-phase coils.

In the present disclosure, the control in which, when the current is increasing before phase switching from in phase to out of phase, the phase switching from in phase to out of phase is performed and phase switching from out of phase to in phase is then performed so that the current increases after this phase switching from out of phase to in phase is referred to as "increasing phase switching control."

In the present disclosure, the control in which, when the current is decreasing before phase switching from in phase to out of phase, the phase switching from in phase to out of phase is performed and phase switching from out of phase to in phase is then performed so that the current decreases after this phase switching from out of phase to in phase is referred to as "decreasing phase switching control."

At least either the increasing phase switching control or the decreasing phase switching control may be selected and performed.

The increasing phase switching control and the decreasing phase switching control may be alternately performed. In this case, for example, which phase switching control was performed immediately before the vehicle was stopped is recorded in a non-volatile memory etc., and the phase switching control that was not performed last time is performed the next time the vehicle is started.

Figure 15:
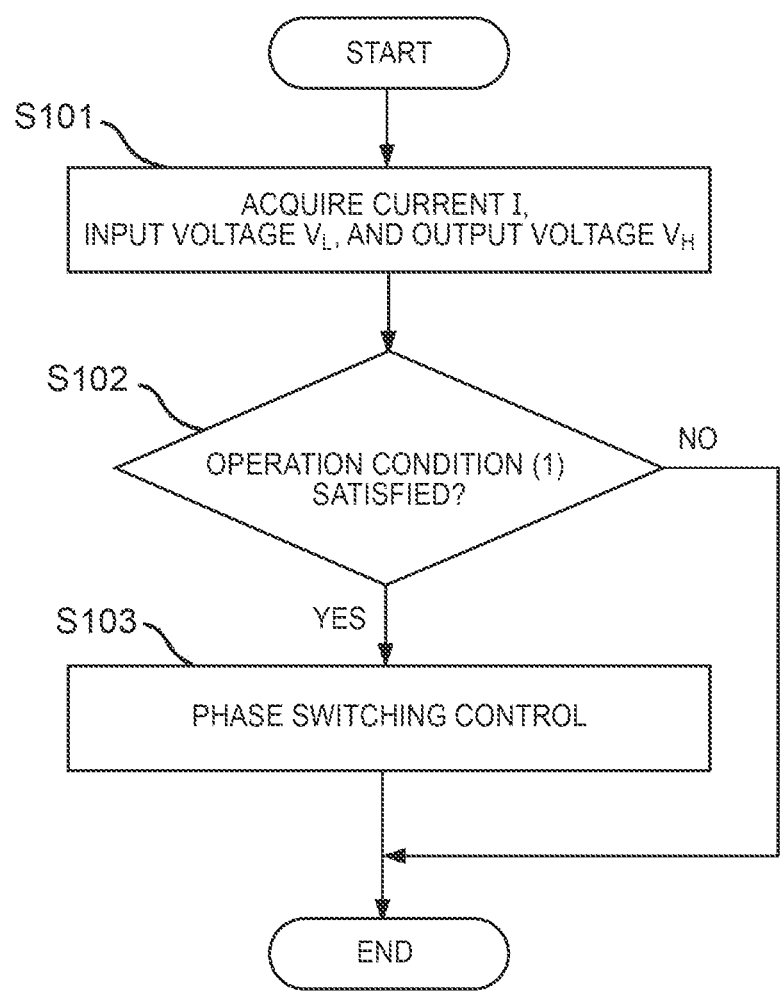
FIG. 15 is a flowchart showing an example of phase switching control in a typical example of the present disclosure.

FIG. 15 is a flowchart showing an example of the phase switching control in the typical example of the present disclosure.

The control unit acquires the current value (reactor current value) I flowing through the coil, the input voltage $V_L$ from the power supply, and the set output voltage $V_H$ (S101).

The control unit then determines whether the operation condition (1) is satisfied, based on the acquired current value I and input voltage $V_L$ for the set output voltage $V_H$ (S102).

In the case where in-phase driving is being performed when the control unit determines that the operation condition (1) is satisfied, the control unit performs phase switching to out of phase. In the case where out-of-phase driving is being performed when the control unit determines that the operation condition (1) is satisfied, the control unit performs phase switching to in phase. The control unit thus ends the control (S103). On the other hand, when the control unit determines in S102 that the operation condition (1) is not satisfied, the control unit ends the control without performing the phase switching control.

Figure 16:
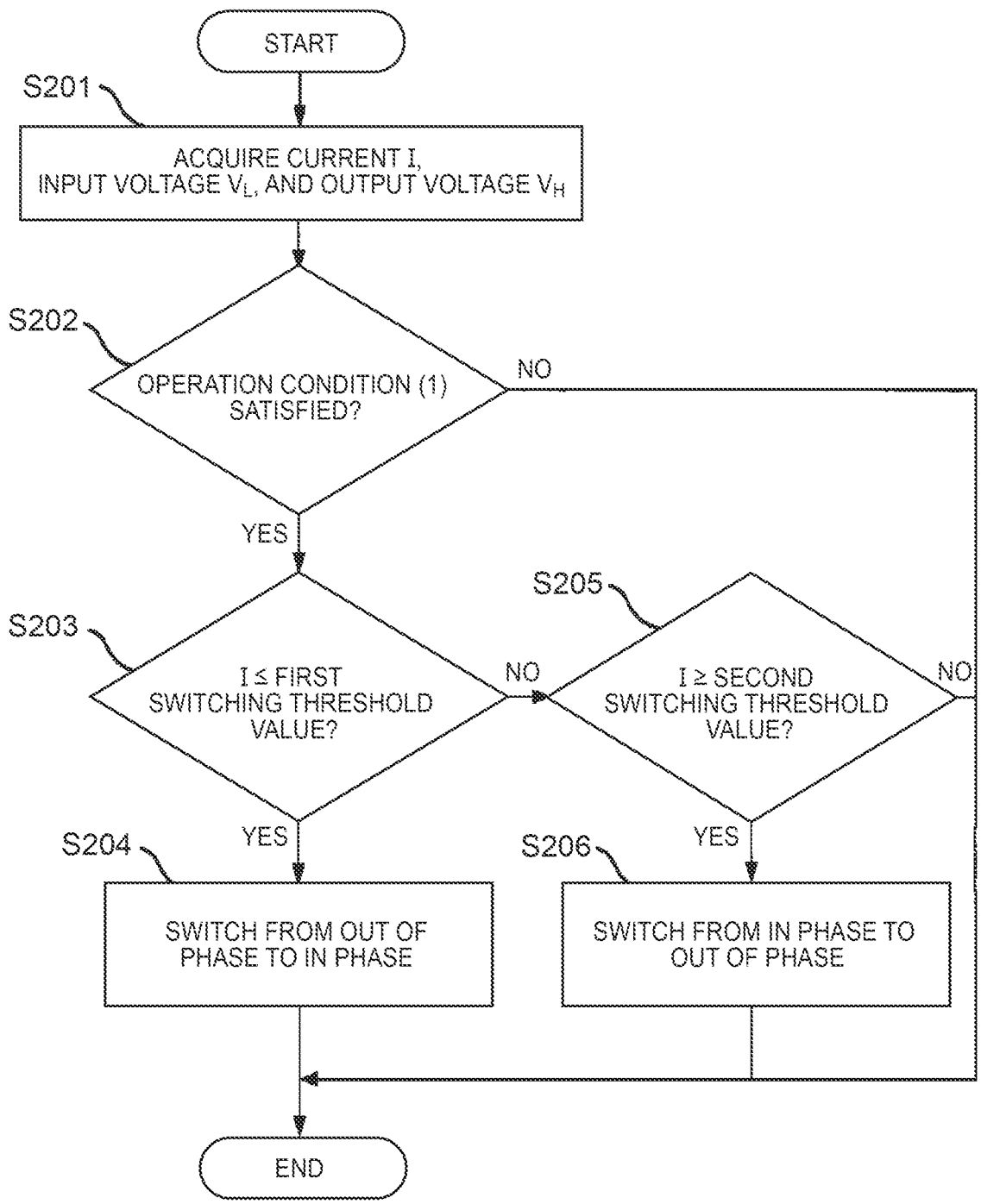
FIG. 16 is a flowchart showing an example of phase switching control in a specific example of the present disclosure.

FIG. 16 is a flowchart showing an example of the phase switching control in the specific example of the present disclosure.

The control unit acquires the current value (reactor current value) I flowing through the coil, the input voltage $V_L$ from the power supply, and the set output voltage $V_H$ (S201).

The control unit then determines whether the operation condition (1) is satisfied, based on the acquired current value I and input voltage $V_L$ for the set output voltage $V_H$ (S202).

When the control unit determines that the operation condition (1) is satisfied, the control unit determines whether the current value I flowing through the coil is equal to or less than the predetermined first switching threshold value (S203).

In the case where out-of-phase driving is being performed when the control unit determines that the current value I flowing through the coil is equal to or less than the predetermined first switching threshold value, the control unit performs phase switching to in phase (S204). In the case where in-phase driving is being performed when the control unit determines that the current value I flowing through the coil is equal to or less than the predetermined first switching threshold value, the control unit continues the in-phase driving in S204.

On the other hand, when the control unit determines in S204 that the current value I flowing through the coil is larger than the predetermined first switching threshold value, the control unit determines whether the current value I flowing through the coil is equal to or larger than the predetermined second switching threshold value that is larger than the predetermined first switching threshold value (S205).

In the case where in-phase driving is being performed when the control unit determines that the current value I flowing through the coil is equal to or larger than the predetermined second switching threshold value, the control unit performs phase switching to out of phase (S206). In the case where out-of-phase driving is being performed when the control unit determines that the current value I flowing through the coil is equal to or larger than the predetermined second switching threshold value, the control unit continues the out-of-phase driving in S206.

When the control unit determines in S205 that the current value I flowing through the coil is less than the predetermined second switching threshold value, the control unit ends the control without performing the phase switching control.

Figure 17:
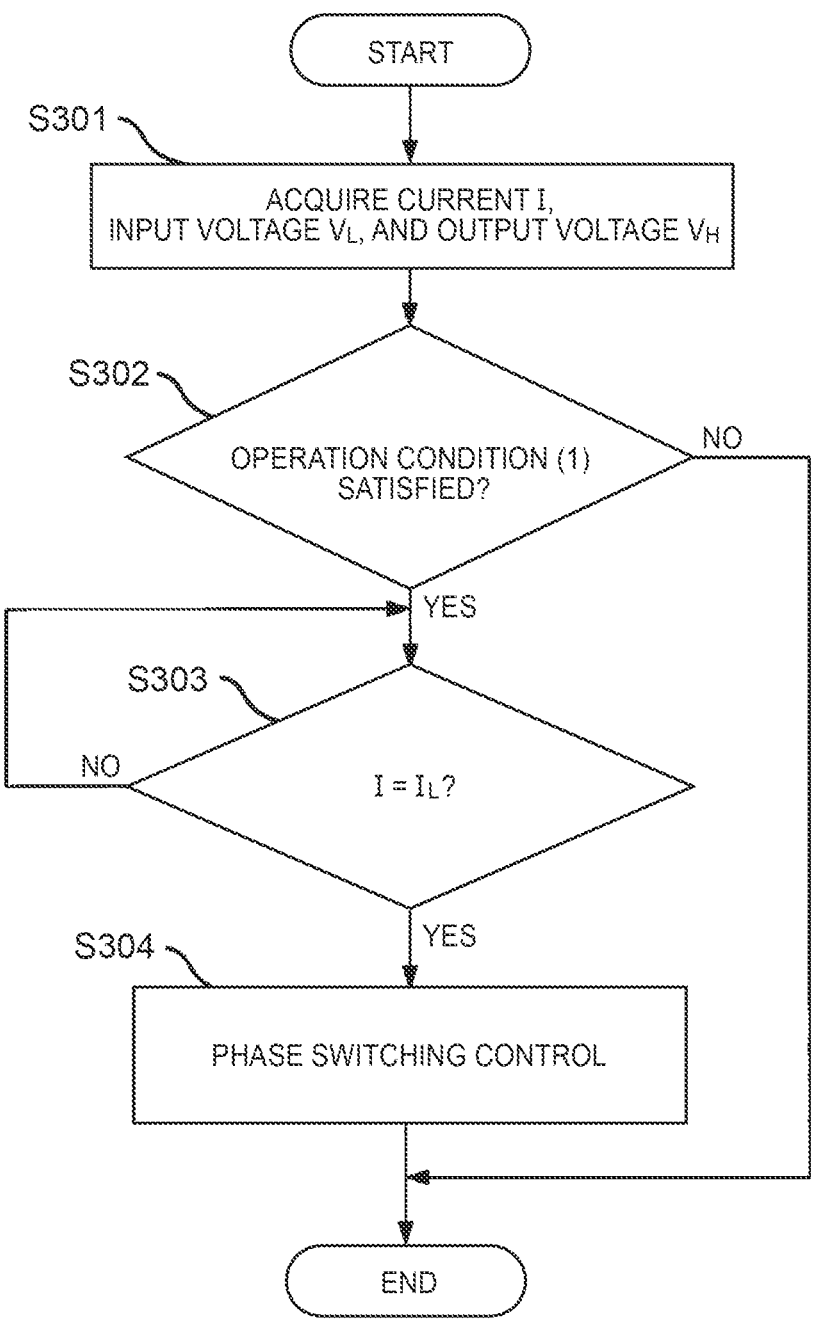
FIG. 17 is a flowchart showing an example of phase switching control in a first modification of the present disclosure.

FIG. 17 is a flowchart showing an example of the phase switching control in the first modification of the present disclosure.

The control unit acquires the current value (reactor current value) I flowing through the coil, the input voltage $V_L$ from the power supply, and the set output voltage $V_H$ (S301).

The control unit then determines whether the operation condition (1) is satisfied, based on the acquired current value I and input voltage $V_L$ for the set output voltage $V_H$ (S302).

When the control unit determines that the operation condition (1) is satisfied, the control unit determines whether the current value I flowing through the coil matches the reactor average current value $I_L$ (S303).

In the case where in-phase driving is being performed when the control unit determines that the current value I flowing through the coil matches the reactor average current value $I_L$, the control unit performs phase switching to out of phase. In the case where out-of-phase driving is being performed when the control unit determines that the current value I flowing through the coil matches the reactor average current value $I_L$, the control unit performs phase switching to in phase. The control unit thus ends the control (S304).

On the other hand, when the control unit determines in S303 that the current value I flowing through the coil does not match the reactor average current value $I_L$, the control unit returns to S303 and determines again whether the current value I flowing through the coil matches the reactor average current value $I_L$.

Figure 18:
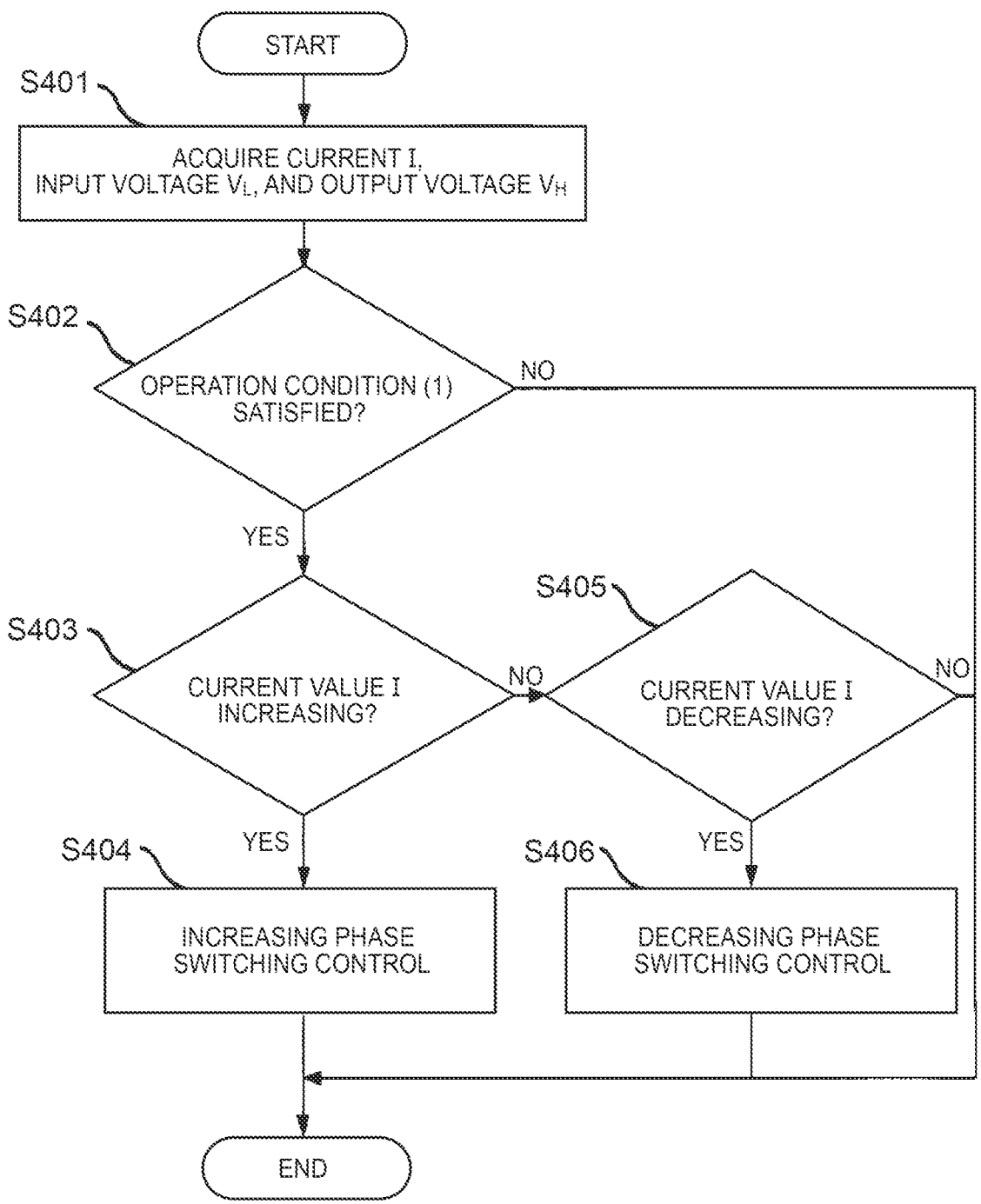
FIG. 18 is a flowchart showing an example of phase switching control in a second modification of the present disclosure.

FIG. 18 is a flowchart showing an example of the phase switching control in the second modification of the present disclosure.

The control unit acquires the current value (reactor current value) I flowing through the coil, the input voltage $V_L$ from the power supply, and the set output voltage $V_H$ (S401).

The control unit then determines whether the operation condition (1) is satisfied, based on the acquired current value I and input voltage $V_L$ for the set output voltage $V_H$ (S402). When the control unit determines in S402 that the operation condition (1) is not satisfied, the control unit ends the control without performing the phase switching control.

When the control unit determines that the operation condition (1) is satisfied, the control unit determines whether the current value I flowing through the coil is increasing before phase switching from in phase to out of phase (S403).

When the control unit determines that the current value I flowing through the coil is increasing before phase switching from in phase to out of phase, the control unit performs the phase switching from in phase to out of phase and then performs phase switching from out of phase to in phase so that the current value I flowing through the coil increases after the phase switching from out of phase to in phase. Namely, the control unit performs the increasing phase switching control. The control unit thus ends the control (S404).

On the other hand, when the control unit determines that the current value I flowing through the coil is not increasing before phase switching from in phase to out of phase, the control unit determines whether the current value I flowing through the coil is decreasing before phase switching from in phase to out of phase (S405).

When the control unit determines that the current value I flowing through the coil is decreasing before phase switching from in phase to out of phase, the control unit performs the phase switching from in phase to out of phase and then performs phase switching from out of phase to in phase so that the current value I flowing through the coil decreases after the phase switching from out of phase to in phase. Namely, the control unit performs the decreasing phase switching control. The control unit thus ends the control (S406). When the control unit determines in S405 that the current value I flowing through the coil is not decreasing before phase switching from in phase to out of phase, that is, when the current value I flowing through the coil is neither increasing nor decreasing, the control unit ends the control without performing the phase switching control.

What is claimed is:

1. A power supply unit comprising:
a power supply; and
a converter, wherein:
the converter is configured to perform at least one operation selected from a group consisting of boosting and stepping down of an output voltage of the power supply;
the converter includes a reactor in which n-phase coils are magnetically coupled to each other (where n is an integer of 2 or more), n-phase switches each connected to a corresponding one of the n-phase coils, and a control unit;
the control unit is configured to control duty cycles of the n-phase switches;
the control unit is configured to monitor a value of current flowing through the n-phase coils;
the control unit is configured to perform phase switching control in a case where the control unit determines that a first operation condition is satisfied, the phase switching control including phase switching from in phase to out of phase in a case where the n-phase switches are being driven in phase, and phase switching from out of phase to in phase in a case where the n-phase switches are being driven out of phase; and
the first operation condition is that, when an inlet voltage and an outlet voltage of the converter have predetermined voltage values, the converter is operated in a discontinuous mode in a case where the n-phase switches are being driven in phase, and the converter is operated in a continuous mode in a case where the n-phase switches are being driven out of phase, the discontinuous mode being a mode having a period in which the value of current flowing through the n-phase coils is zero during one cycle of duty cycle control, and the continuous mode being a mode having no period in which the value of current flowing through the n-phase coils is zero during one cycle of the duty cycle control.

2. The power supply unit according to claim 1, wherein:
the control unit is configured to store in advance a data group including preset values of the inlet voltage and the outlet voltage of the converter and the value of current flowing through the n-phase coils, the data group satisfying the first operation condition; and
the control unit is configured to determine whether the first operation condition is satisfied, by referring to the data group.

3. The power supply unit according to claim 1, wherein the control unit is configured to perform the phase switching control at a timing when the value of current flowing through the n-phase coils matches an average value of current of the n-phase coils, in a case where the control unit determines that the first operation condition is satisfied.

4. The power supply unit according to claim 1, wherein the control unit is configured to, in a case where the value of current flowing through the n-phase coils is increasing before the phase switching from in phase to out of phase in the phase switching control, perform the phase switching from in phase to out of phase and then perform the phase switching from out of phase to in phase in such a way that the value of current flowing through the n-phase coils increases after the phase switching from out of phase to in phase.

5. The power supply unit according to claim 1, wherein the control unit is configured to, in a case where the value of current flowing through the n-phase coils is decreasing before the phase switching from in phase to out of phase in the phase switching control, perform the phase switching from in phase to out of phase and then perform the phase switching from out of phase to in phase in such a way that the value of current flowing through the n-phase coils decreases after the phase switching from out of phase to in phase.

6. The power supply unit according to claim 1, wherein the out of phase is a phase difference of $(360/n)°$.

7. The power supply unit according to claim 1, wherein:
n-phases are two phases; and
the out of phase is a phase difference of 180°.

8. The power supply unit according to claim 1, wherein the power supply is a fuel cell.

9. The power supply unit according to claim 1, wherein:
the control unit is configured to perform the phase switching from out of phase to in phase in a case where the control unit determines that the value of current flowing through the n-phase coils is equal to or less than a predetermined first switching threshold value in the phase switching control; and
the control unit is configured to perform the phase switching from in phase to out of phase in a case where the control unit determines that the value of current flowing through the n-phase coils is equal to or larger than a predetermined second switching threshold value that is larger than the predetermined first switching threshold value in the phase switching control.

* * * * *